US012746968B2

(12) United States Patent
Narayan

(10) Patent No.: US 12,746,968 B2
(45) Date of Patent: Sep. 29, 2026

(54) SYSTEM AND METHOD FOR DETECTING MISALIGNED STEERING COLUMN

(71) Applicant: Atieva, Inc., Menlo Park, CA (US)

(72) Inventor: Divyendu Narayan, San Jose, CA (US)

(73) Assignee: Atieva, Inc., Menlo Park, CA (US)

( * ) Notice: Subject to any disclaimer, the term of this patent is extended or adjusted under 35 U.S.C. 154(b) by 564 days.

(21) Appl. No.: 18/197,068

(22) Filed: May 13, 2023

(65) Prior Publication Data

US 2023/0365186 A1 Nov. 16, 2023

Related U.S. Application Data

(60) Provisional application No. 63/342,033, filed on May 13, 2022.

(51) Int. Cl.
*B62D 5/04* (2006.01)

(52) U.S. Cl.
CPC .................................. *B62D 5/0466* (2013.01)

(58) Field of Classification Search
CPC ................ B62D 5/0466; B62D 5/0457; B62D 15/0245; B62D 15/0235
See application file for complete search history.

(56) References Cited

U.S. PATENT DOCUMENTS 4,856,607 A * 8/1989 Sueshige .................. B62D 6/02 701/42
6,354,396 B1 * 3/2002 Horton ...................... H02P 6/16 180/446
2007/0169986 A1 * 7/2007 Choi .................. B62D 15/0245 180/444
2009/0187311 A1 * 7/2009 Christiansen ........ B62D 5/0469 701/41
2010/0023221 A1 * 1/2010 Klein ..................... B62D 6/002 701/42
2010/0126794 A1 * 5/2010 Shiino .................... B62D 5/064 180/444

(Continued)

FOREIGN PATENT DOCUMENTS

JP 7063428 B1 5/2022

OTHER PUBLICATIONS

International Search Report and Written Opinion received for PCT Patent Application No. PCT/US2023/022175, mailed on Sep. 19, 2023, 15 pages.

(Continued)

*Primary Examiner* — Redhwan K Mawari
(74) *Attorney, Agent, or Firm* — Womble Bond Dickinson (US) LLP

(57) ABSTRACT

A method for determining the center of the rack position of a vehicle including initiating a move rack to first extreme routine, whereby the steering column of a vehicle is turned to its furthest most point in a first direction; initiating a move rack to second extreme routine, whereby the steering column of a vehicle is turned to its furthest most point in a second direction opposite from the first direction; initiating a centering routine, whereby the steering column of a vehicle is turned to its center position; and initiating an evaluation routine whereby a steering angle is queried from the steering angle sensor in the vehicle's steering column control module; and vehicles and non-transitory computer-readable media incorporating same.

21 Claims, 3 Drawing Sheets

(56) References Cited

U.S. PATENT DOCUMENTS

| | | | | |
|---|---|---|---|---|
| 2011/0030478 | A1* | 2/2011 | Park | F22B 37/005 73/622 |
| 2011/0093163 | A1 | 4/2011 | Byun | |
| 2011/0303478 | A1 | 12/2011 | Ellis et al. | |
| 2012/0265404 | A1* | 10/2012 | Kim | B62D 6/002 701/43 |
| 2013/0199865 | A1* | 8/2013 | Park | B62D 6/02 180/422 |
| 2017/0355397 | A1* | 12/2017 | Watanabe | B62D 6/003 |
| 2018/0099691 | A1* | 4/2018 | Kim | B62D 6/008 |
| 2018/0141584 | A1* | 5/2018 | El Aile | B62D 5/0433 |
| 2019/0084611 | A1* | 3/2019 | Klein | B62D 5/006 |
| 2019/0111803 | A1* | 4/2019 | Ryu | B60L 15/2036 |
| 2020/0156702 | A1* | 5/2020 | Dodak | G01D 5/145 |
| 2022/0048558 | A1* | 2/2022 | Christian, Jr. | B62D 15/0245 |
| 2022/0289276 | A1* | 9/2022 | Nichols | B62D 1/183 |
| 2024/0140525 | A1 | 5/2024 | Maruyama et al. | |

OTHER PUBLICATIONS

Invitation to Pay additional Fee for PCT Patent Application No. PCT/US2023/022175, mailed on Jul. 14, 2023, 2 pages.

Extended European Search Report and Search Opinion received for European Application No. 23804382.2, mailed on Apr. 9, 2026, 10 pages.

Office Action received for European Application No. 23804382.2, mailed on Apr. 29, 2026, 1 page.

* cited by examiner

SYSTEM AND METHOD FOR DETECTING MISALIGNED STEERING COLUMN

CROSS-REFERENCE TO OTHER APPLICATIONS

This application claims priority to U.S. App. Ser. No. 63/342,033, filed May 13, 2022.

FIELD OF THE DISCLOSURE

This disclosure relates generally to vehicles, and more specifically to a steering column in an electric vehicle with a computerized system that monitors the position of the steering column's steering angle and a rotor position angle for a power steering system having a rotor position sensor, which can be used to track the pinion angle.

BACKGROUND

Modern vehicles track numerous values during the operation of a vehicle, including but not limited to a steering angle and pinion angle. When steering assembly, including the electric power steering (EPS), intermediate shaft, steering column, and steering column control module (SCCM), is being serviced, the angular alignment of SCCM's steering angle can change with respect to EPS' pinion angle. This misalignment can lead to several problems with operation of the vehicle, including limiting the turning ability of the vehicle, and disabling or interfering with automatic driving assist features. If the misalignment is not detected before the vehicle leaves the service shop, it could be dangerous for the operator of the vehicle.

Some existing systems track changes to the steering column by synchronizing the EPS to the SCCM steering angle, however such systems do not consider that their relative angular alignment could have changed between power cycles, or in circumstances under which a change cannot be tracked by those systems—such as when a vehicle battery is disconnected and cannot provide power to the EPS's rotor position sensor and/or the SCCM's steering angle sensor.

The disclosed concepts seek to address this shortcoming by detecting such misalignments and notifying the service technician and/or operator of the vehicle that the steering column is misaligned, and further servicing is required.

BRIEF SUMMARY OF THE DISCLOSURE

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

In one embodiment of the disclosure a method for determining the center of the rack position of a vehicle may include (a) initiating a move rack to first extreme routine, whereby the steering column of a vehicle may be automatically engaged to turn the steering column to its furthest most point in a first direction, thereby turning a rack of a vehicle to a first extreme; (b) initiating a move rack to second extreme routine, whereby the steering column of a vehicle may be automatically engaged to turn the steering column to its furthest most point in a second direction opposite from the first direction, there by turning the rack of the vehicle to a second extreme; (c) initiating a centering routine, whereby the steering column of a vehicle may be automatically engaged to turn the steering column to its center position such that the rack is centered relative to the first extreme and the second extreme; and (d) initiating an evaluation routine whereby a steering angle may be queried from the steering angle sensor in the vehicle's steering column control module, and a value of the steering angle is compared to a threshold such that if an absolute value of the steering angle exceeds a threshold an error message is initiated.

In some embodiments, a method for tracking pinion position while a vehicle is turned off may include: (a) initiating a low power mode in an electric power steering system; (b) aggregating changes to a rotor position monitored by a rotor position sensor; and (c) dividing the aggregate changes to the rotor position by a gear ratio of a gear box to calculate a change a pinion angle.

In an embodiment, a vehicle may include a rack, a steering column and a power steering system. The steering column may include a steering wheel and a steering column control module having a steering angle sensor. The power steering system may include a motor having a rotor position sensor, a gear box, an electronic control unit, and a pinion connected to the steering column. The electronic control unit may include a processor and a non-transitory computer-readable medium having instructions that when executed by the processor cause the electronic control unit to: (a) initiate a move rack to first extreme routine, whereby the steering column may be automatically engaged to turn the steering column to its furthest most point in a first direction, thereby turning a rack of a vehicle to a first extreme; (b) initiate a move rack to second extreme routine, whereby the steering column may be automatically engaged to turn the steering column to its furthest most point in a second direction opposite from the first direction, there by turning the rack of the vehicle to a second extreme; (c) initiate a centering routine, whereby the steering column may be automatically engaged to turn the steering column to its center position such that the rack is centered relative to the first extreme and the second extreme, and (d) initiate an evaluation routine whereby a steering angle may be queried from the steering angle sensor in the steering column control module, and a value of the steering angle is compared to a threshold such that if an absolute value of the steering angle exceeds a threshold an error message is initiated.

In an embodiment, a vehicle may include a steering column that may have a steering wheel and a steering column control module having a steering angle sensor, and a power steering system that may include a motor having a rotor position sensor, a gear box, an electronic control unit, and a pinion connected to the steering column. The electronic control unit may include a processor and a non-transitory computer-readable medium having instructions that when executed by the processor cause the electronic control unit to: (a) initiate a low power mode in the power steering system; (b) aggregate changes to a rotor position monitored by a rotor position sensor; and (c) divide the aggregate changes to the rotor position by a gear ratio of a gear box to calculate a change to a pinion angle.

In an embodiment, a non-transitory computer readable medium may have instructions that when executed by the processor cause a computer to: (a) initiate a move rack to first extreme routine, whereby a steering column is automatically engaged to turn the steering column to its furthest most point in a first direction, thereby turning a rack of a vehicle to a first extreme; (b) initiate a move rack to second extreme routine, whereby the steering column is automatically engaged to turn the steering column to its furthest most point in a second direction opposite from the first direction, there by turning the rack of the vehicle to a second extreme; (c) initiate a centering routine, whereby the steering column is automatically engaged to turn the steering column to its center position such that the rack is centered relative to the first extreme and the second extreme, and (d) initiate an evaluation routine whereby a steering angle is queried from the steering angle sensor in the steering column control module, and a value of the steering angle is compared to a threshold such that if an absolute value of the steering angle exceeds a threshold an error message is initiated.

In an embodiment, a non-transitory computer readable medium may have instructions that when executed by the processor cause a computer to: (a) initiate a low power mode in the power steering system; (b) aggregate changes to a rotor position monitored by a rotor position sensor; and (c) divide the aggregate changes to the rotor position by a gear ratio of a gear box to calculate a change to a pinion angle.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings.

DETAILED DESCRIPTION OF THE DISCLOSURE

Figure 1:
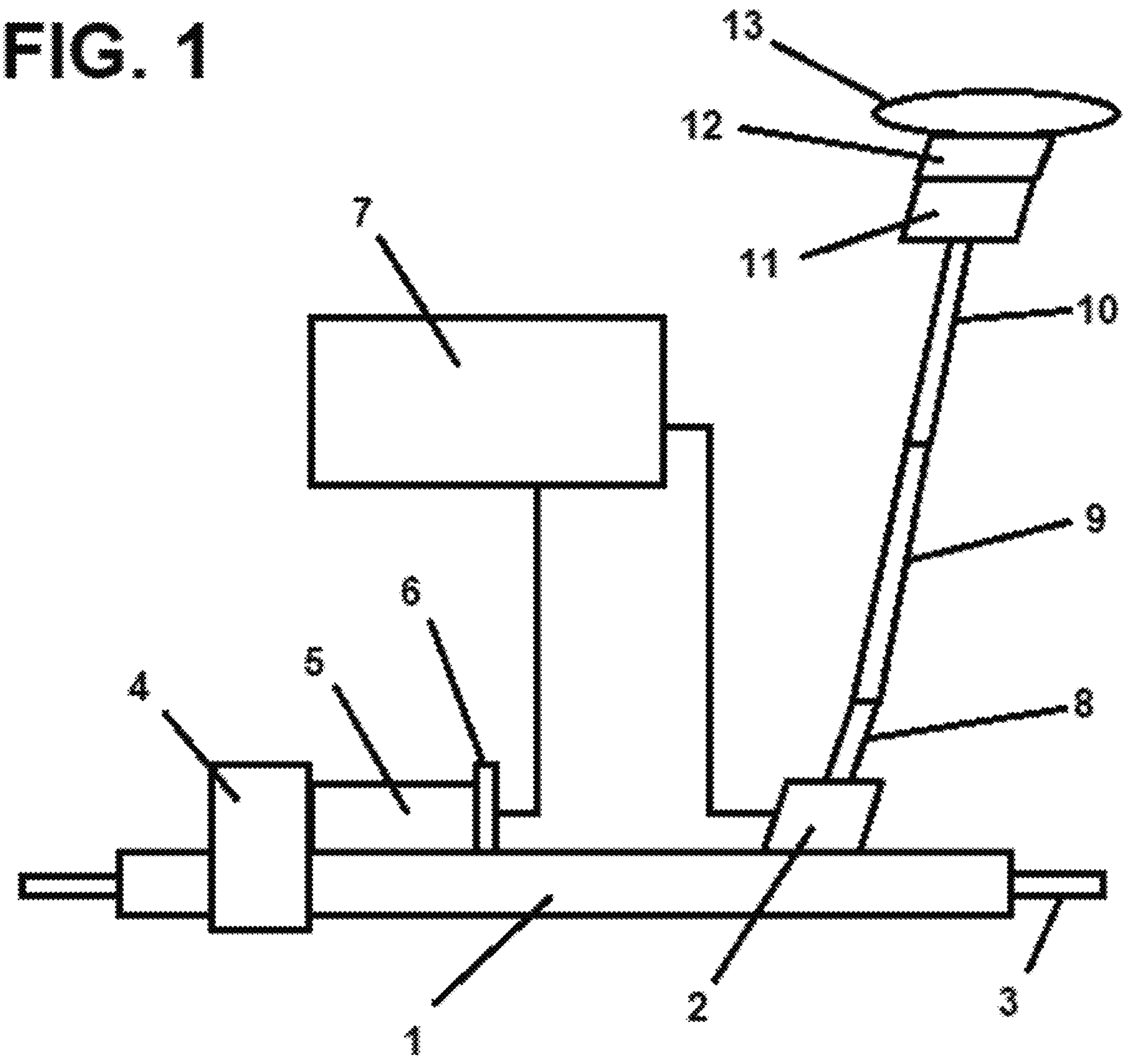
FIG. 1 illustrates a system diagram of an embodiment of a steering column system in accordance with the disclosed concepts.

The following detailed description and the appended drawings describe and illustrate some embodiments for the purpose of enabling one of ordinary skill in the relevant art to make use the invention. As such, the detailed description and illustration of these embodiments are purely illustrative in nature and are in no way intended to limit the scope of the invention, or its protection, in any manner. It should also be understood that the drawings are not necessarily to scale and in certain instances details may have been omitted, which are not necessary for an understanding of the disclosure, such as details of fabrication and assembly. In the accompanying drawings, like numerals represent like components.

In one embodiment of the disclosure a method for determining the center of the rack position of a vehicle may include (a) initiating a move rack to first extreme routine, whereby the steering column of a vehicle may be automatically engaged to turn the steering column to its furthest most point in a first direction, thereby turning a rack of a vehicle to a first extreme; (b) initiating a move rack to second extreme routine, whereby the steering column of a vehicle may be automatically engaged to turn the steering column to its furthest most point in a second direction opposite from the first direction, there by turning the rack of the vehicle to a second extreme; (c) initiating a centering routine, whereby the steering column of a vehicle may be automatically engaged to turn the steering column to its center position such that the rack is centered relative to the first extreme and the second extreme; and (d) initiating an evaluation routine whereby a steering angle may be queried from the steering angle sensor in the vehicle's steering column control module, and a value of the steering angle is compared to a threshold such that if an absolute value of the steering angle exceeds a threshold an error message is initiated.

In certain embodiments, the first direction may be left, and the second direction may be right. In certain embodiments, the first direction may be right, and the second direction may be left. In certain embodiments, an electric power steering system is engaged to automatically turn the steering column. In certain embodiments, the initiating a move rack to first extreme routine may involve aggregating a rotor position angle from a rotor position sensor. In certain embodiments, the initiating a move rack to second extreme routine may involve aggregating a rotor position angle from a rotor position sensor. In certain embodiments, a pinion may be synchronized to the steering column control module's steering angle if the absolute value of the steering angle is below a threshold.

In an embodiment, a method for tracking pinion position while a vehicle is turned off may include: (a) initiating a low power mode in an electric power steering system; (b) aggregating changes to a rotor position monitored by a rotor position sensor; and (c) dividing the aggregate changes to the rotor position by a gear ratio of a gear box to calculate a change a pinion angle.

In certain embodiments the low-power mode in the electric power steering system may be initiated when the vehicle is turned off. In certain embodiments, the method may further include (d) querying the steering column control module for a steering angle tracked by a steering angle sensor; and (e) evaluating the steering angle in view of the calculated change in the pinion angle and comparing same to a threshold. In certain embodiments, the method may further include initiating an error message when an absolute value of a comparison of the calculated pinion angle and an expected pinion angle based on the steering angle exceeds a threshold. In certain embodiments, the method may further include synchronizing the calculated pinion angle to steering angle when the absolute value of a comparison of the calculated pinion angle and the expected pinion angle based on the steering angle is less than the threshold.

In an embodiment, a vehicle may include a rack, a steering column and a power steering system. The steering column may include a steering wheel and a steering column control module having a steering angle sensor. The power steering system may include a motor having a rotor position sensor, a gear box, an electronic control unit, and a pinion connected to the steering column. The electronic control unit may include a processor and a non-transitory computer-readable medium having instructions that when executed by the processor cause the electronic control unit to: (a) initiate a move rack to first extreme routine, whereby the steering column may be automatically engaged to turn the steering column to its furthest most point in a first direction, thereby turning a rack of a vehicle to a first extreme; (b) initiate a move rack to second extreme routine, whereby the steering column may be automatically engaged to turn the steering column to its furthest most point in a second direction opposite from the first direction, there by turning the rack of the vehicle to a second extreme; (c) initiate a centering routine, whereby the steering column may be automatically engaged to turn the steering column to its center position such that the rack is centered relative to the first extreme and the second extreme, and (d) initiate an evaluation routine whereby a steering angle may be queried from the steering angle sensor in the steering column control module, and a value of the steering angle is compared to a threshold such that if an absolute value of the steering angle exceeds a threshold an error message is initiated.

In certain embodiments, the first direction may be left, and the second direction may be right. In certain embodiments, the first direction may be right, and the second direction may be left. In certain embodiments, the power steering system may be an electric power steering system and may be engaged to automatically turn the steering column. In certain embodiments, the initiate the move rack to first extreme routine may involve aggregating a rotor position angle from a rotor position sensor. In certain embodiments, the initiate the move rack to second extreme routine may involve aggregating a rotor position angle from a rotor position sensor. In certain embodiments, the pinion may be synchronized to the steering column control module's steering angle sensor if the absolute value of the steering angle is below a threshold.

In an embodiment, a vehicle may include a steering column that may have a steering wheel and a steering column control module having a steering angle sensor, and a power steering system that may include a motor having a rotor position sensor, a gear box, an electronic control unit, and a pinion connected to the steering column. The electronic control unit may include a processor and a non-transitory computer-readable medium having instructions that when executed by the processor cause the electronic control unit to: (a) initiate a low power mode in the power steering system; (b) aggregate changes to a rotor position monitored by a rotor position sensor; and (c) divide the aggregate changes to the rotor position by a gear ratio of a gear box to calculate a change to a pinion angle.

In certain embodiments, the low-power mode in the electric power steering system may be initiated when the vehicle is turned off. In certain embodiments, the instructions further cause the electronic control unit to: (d) query the steering column control module for a steering angle tracked by a steering angle sensor; and (e) evaluate the steering angle in view of the calculated change in the pinion angle and comparing same to a threshold. In certain embodiments, the instructions further cause the electronic control unit to: initiate an error message when an absolute value of a comparison of the calculated pinion angle and an expected pinion angle based on the steering angle exceeds a threshold. In certain embodiments, the instructions further cause the electronic control unit to synchronize the calculated pinion angle to steering angle when the absolute value of a comparison of the calculated pinion angle and the expected pinion angle based on the steering angle is less than the threshold.

In an embodiment, a non-transitory computer readable medium may have instructions that when executed by the processor cause a computer to: (a) initiate a move rack to first extreme routine, whereby a steering column is automatically engaged to turn the steering column to its furthest most point in a first direction, thereby turning a rack of a vehicle to a first extreme; (b) initiate a move rack to second extreme routine, whereby the steering column is automatically engaged to turn the steering column to its furthest most point in a second direction opposite from the first direction, there by turning the rack of the vehicle to a second extreme; (c) initiate a centering routine, whereby the steering column is automatically engaged to turn the steering column to its center position such that the rack is centered relative to the first extreme and the second extreme, and (d) initiate an evaluation routine whereby a steering angle is queried from the steering angle sensor in the steering column control module, and a value of the steering angle is compared to a threshold such that if an absolute value of the steering angle exceeds a threshold an error message is initiated.

In certain embodiments, the first direction may be left, and the second direction may be right. In certain embodiments, the first direction may be right, and the second direction may be left. In certain embodiments, the power steering system may be an electric power steering system and may be engaged to automatically turn the steering column. In certain embodiments, the initiate the move rack to first extreme routine may involve aggregating a rotor position angle from a rotor position sensor. In certain embodiments, the initiate the move rack to second extreme routine may involve aggregating a rotor position angle from a rotor position sensor. In certain embodiments, the pinion may be synchronized to the steering column control module's steering angle sensor if the absolute value of the steering angle is below a threshold.

In an embodiment, a non-transitory computer readable medium may have instructions that when executed by the processor cause a computer to: (a) initiate a low power mode in the power steering system; (b) aggregate changes to a rotor position monitored by a rotor position sensor; and (c) divide the aggregate changes to the rotor position by a gear ratio of a gear box to calculate a change to a pinion angle.

In certain embodiments, the low-power mode in the electric power steering system may be initiated when the vehicle is turned off. In certain embodiments, the instructions may further cause the computer to: (d) query the steering column control module for a steering angle tracked by a steering angle sensor; and (e) evaluate the steering angle in view of the calculated change in the pinion angle and comparing same to a threshold. In certain embodiments, the instructions further cause the computer to initiate an error message when an absolute value of a comparison of the calculated pinion angle and an expected pinion angle based on the steering angle exceeds a threshold. In certain embodiments, the instructions further cause the computer to synchronize the calculated pinion angle to steering angle when the absolute value of a comparison of the calculated pinion angle and the expected pinion angle based on the steering angle is less than the threshold.

FIG. 1 illustrates a system diagram of a steering column system according to the disclosed concepts. A steering housing 1 may house a rack 3 which extends from the steering housing to effectuate steering changes. The steering housing may further connect to the torque sensor 2, a motor gear box 4, and a motor 5, which may have a rotor position sensor 6. A steering wheel 13 may be connected to an SCCM 12 which may include a steering angle sensor that tracks a steering angle, which may in turn connect to a steering column 11. The steering column may include intermediate shafts, including an upper intermediate shaft 10 and a lower intermediate shaft 9, which may connect to a driver pinion

8 that may connect to a torque sensor 2. An electronic control unit 7 (ECU) may be in electrical communication with the torque sensor 2 and the rotor position sensor 6.

During normal operation of the vehicle, when the operator manipulates the steering wheel 13, the SCCM may track the rotation of the steering wheel by using a steering angle sensor. The SCCM's steering angle sensor may be an absolute angle sensor that may be set to zero corresponding to when the steering wheel is in a neutral position allowing the vehicle to drive straight. The operator's manipulation of the steering wheel 13 further drives the steering column 11 and intermediate shafts 10,9. This in turn drives, the driver pinion 8, which may be an electric power steering pinion to facilitate operation of the steering wheel, and may likely be part of a larger electronic power steering system (EPS) that can be controlled to perform driver assistance functions such as automatic parking, and lane maintenance assistance which require the EPS to have the ability to control the steering column independently of the operator of the vehicle. When the driver pinion 8 is properly synchronized to the SCCM, the driver pinion 8 is in a neutral position when the steering angle sensor is set to zero, such that the car can drive straight. The driver pinion may be in communication with the torque sensor 2. The torque sensor 2 may then provide a signal to the ECU 7, which may control the motor 5 via a control signal. The communication between the torque sensor 2, ECU 7 and motor 5 may be wired or wireless. The motor 5 may drive the gears in the gear box 4, which in turn drive the rack 3. The rotor position sensor 6 may include a magnetic rotor disc and a dual-Hall sensor, (such as the Infenion™ TLE4966V sensor, https://www-.electronicspecifier.com/products/sensors/dual-hall-sensor-detects-rotation-direction-speed) to detect the angle and direction of rotation of the rotor shaft of the motor 5.

Accordingly, during normal operation of the vehicle, changes to the steering angle tracked by the steering angle sensor in the SCCM 12 will have a corresponding effect upon the driver pinion 8 and will be matched by corresponding changes to the rotor position tracked by the rotor position sensor 6. The corresponding changes between the driver pinon and the rotor position will be dependent upon the gear ratio of the motor. Thus by accumulating the changes to the rotor position and then dividing by the gear ratio of motor 5 the corresponding change to the driver pinion angle can be calculated.

Figure 2:
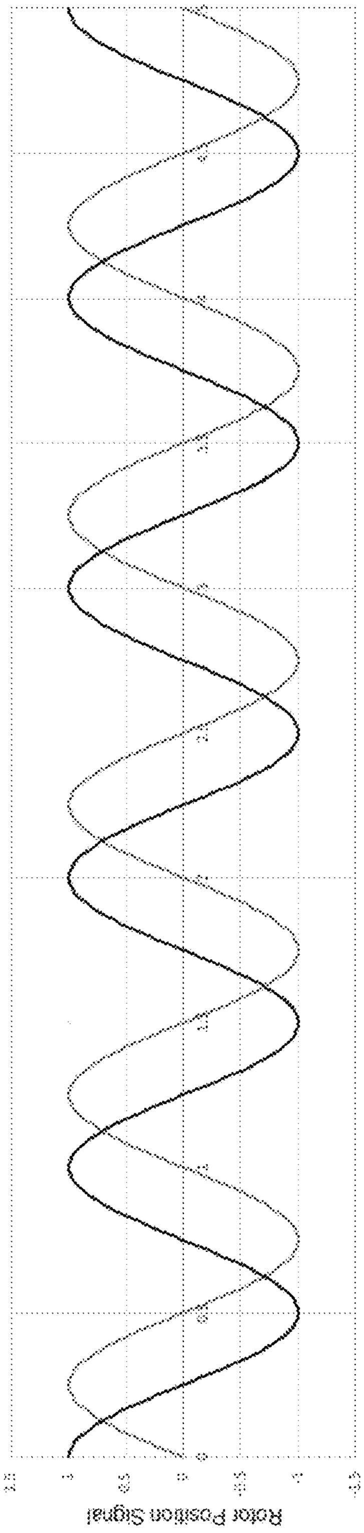
FIG. 2. illustrates a graph showing a rotor position signal, showing sine and cosine signals from the rotor position sensor.

FIG. 2 illustrates a rotor position signal that may be obtained from the rotor position sensor 6, showing sine and cosine graphs, showing sine and cosine signals from the rotor position sensor. At one full revolution the sine and cosine waves will return to their initial values, which repeat for each revolution.

Figure 3:
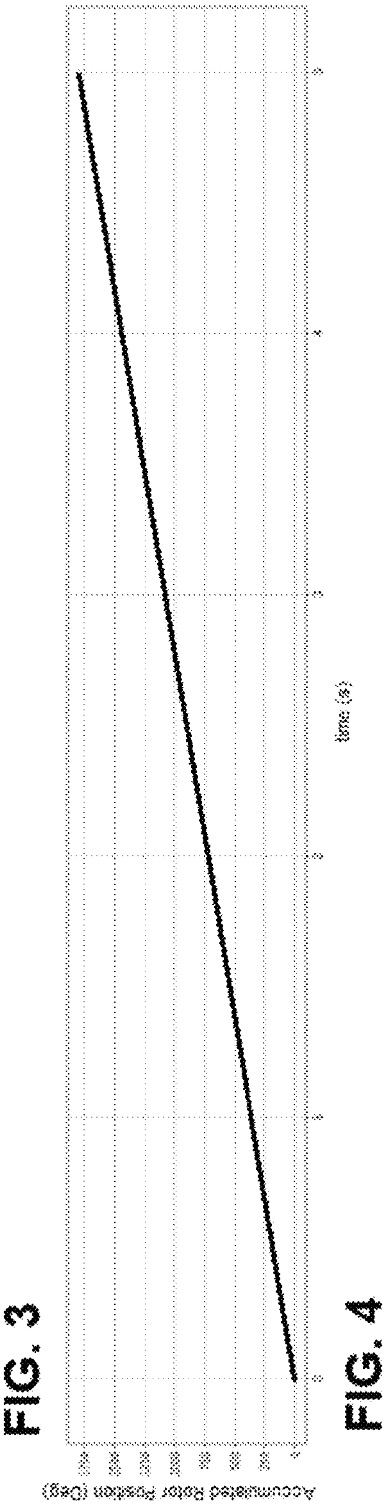
FIG. 3 illustrates a graph showing the accumulated rotor position in degrees, corresponding to the rotor position signal graph of FIG. 2.

FIG. 3 illustrates the accumulated rotor position in degrees, corresponding to the signal depicted in FIG. 2. Every full revolution of the rotor position signal FIG. 2 corresponds to a 360-degree change that is aggregated across the number of times that the rotor completes a revolution in FIG. 3. Thus as the motor 5 rotor is rotating, the rotor position sensor 6 generates the signals shown in FIG. 2, which can be used by the ECU or another computing unit to aggregate the total an. rotated as shown in FIG. 3.

Figure 4:
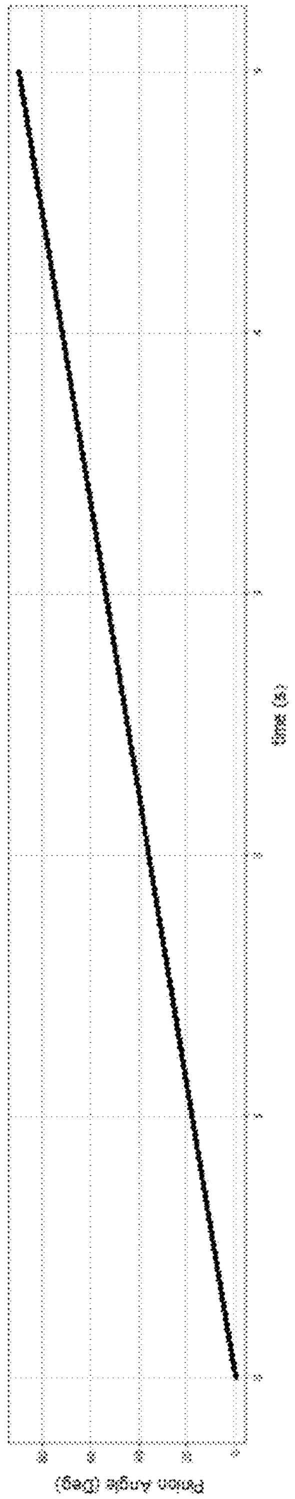
FIG. 4 illustrates the corresponding change in the pinion angle based on the input signal of FIG. 2 and the accumulated rotor position change of FIG. 3.

FIG. 4 illustrates the corresponding change in the pinion angle based on the input signal of FIG. 2 and the accumulated rotor position change of FIG. 3. In this example, every full 360-degree revolution of the accumulated rotor position signal corresponds to a 360 degree change in the rotor position corresponds to approximately a 19 degree change in pinion angle. Thus, by dividing the aggregated rotation of the rotor position, as shown in FIG. 3 and dividing by the gear box ratio of the gear box 4, the pinion angle can be calculated as shown in FIG. 4.

As discussed above, during vehicle maintenance if the battery is disconnected during vehicle maintenance where work is being done on the steering column, the SCCM steering angle and the rotor position sensor's rotor position signal may become misaligned without the opportunity to communicate with one another. For example, if the steering angle or pinion angle is changed under such circumstances while the respective sensors are not powered, the steering column may become misaligned. Accordingly, a routine to test and re-learn the rack 3 center position may be advantageous, as set forth below.

Rack Center Learn Routine 20

Figure 5:
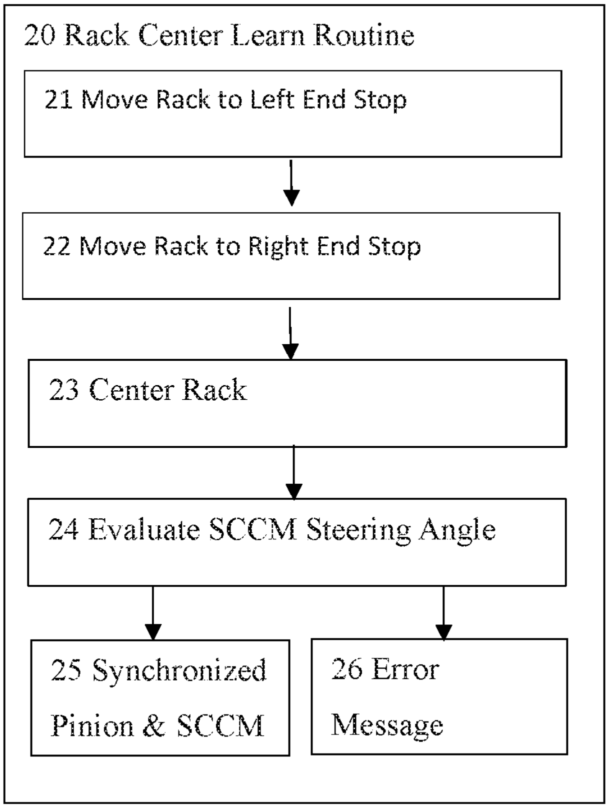
FIG. 5 illustrates a flow diagram for a rack center learn routine.
Figure 6:
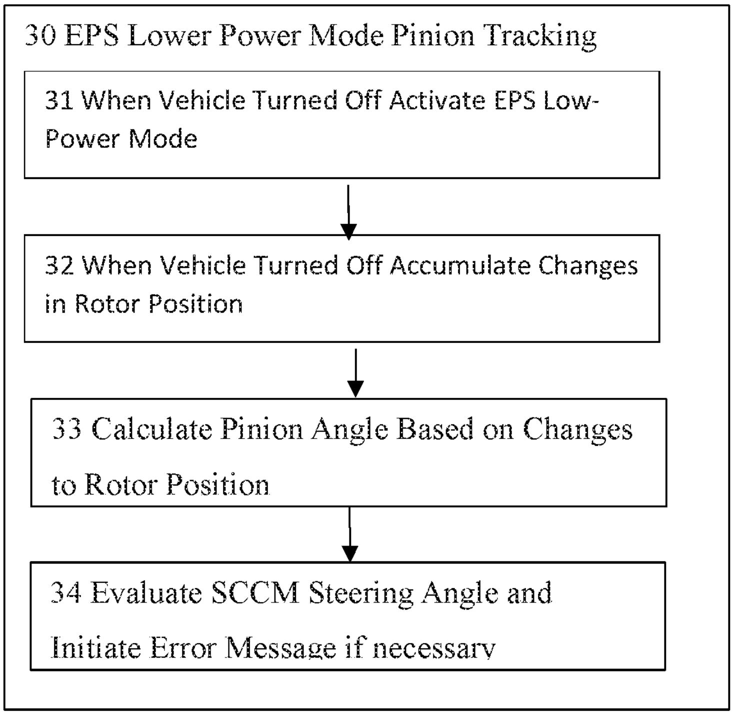
FIG. 6 illustrates a flow diagram for a low-power pinion tracking routine.

FIG. 5 illustrates a Rack Center Learn diagnostic routine 20 that enables the vehicle to find the pinion neutral angle position. In this diagnostic routine the EPS may be instructed to move the steering rack to the left end stop 21 (i.e., all the way to the left). Once the left end stop is reached, the EPS may be instructed to move the steering rack to the right end stop 22 (i.e., all the way to the right). Once the right end stop is found, in some embodiments a sanity check routine may be implemented which tracks the distance between the left end stop and the right end stop. If that distance is less than a threshold value, the system may halt the rack center learn routine 20 and issue an error message instructing the operator to either have further maintenance on the vehicle or to move the vehicle to a smoother surface and to attempt a new rack center learn routine 20. Once the right end stop has been found, the EPS may be instructed to move the steering rack to the center position 23 between the left and right end stops. The steering rack end stop position may be identified and recorded in terms of accumulated rotor position. Once the rack has been centered, the EPS control system may then evaluate the SCCM steering angle 24. At the rack center, if SCCM Steering Angle is near zero within a threshold limit, the EPS Pinion Angle may be synchronized to SCCM Steering Angle 25. If the SCCM steering angle falls outside of the threshold or is not near zero, then the diagnostic routine may provide an error message 26 indicating to the service technician or operator that the steering column is misaligned, and further service is required to correct same. Persons of skill in the art will recognize that the Rack Center Learn routine 20 may be implemented by having either extreme (left or right end stop) checked first, and then checking the other, before bringing the steering rack back to center.

Pinion Angle Tracking in Low Power Mode of EPS 30

In order to enable pinion angle tracking while a vehicle is turned off, an EPS may be provided with a low-power mode. When the vehicle is shutdown, the EPS may activate its low power mode 31. In this mode EPS may not generate motor torque or communicate over a vehicle network. While in low power mode the EPS functionality may be restricted to tracking and accumulating changes in the rotor position 32 by communicating with the rotor position sensor and aggregating changes in rotor position. When the vehicle is turned on again, the EPS may use the accumulate the signed value of rotor position based on a signal from the rotor position sensor 6 and divide it with the gear ratio of the motor gear box 4 in order to calculate changes to the pinion angle 33 while the vehicle is off. The vehicle may then evaluate the SCCM steering angle 34 to ensure that it corresponds appropriately to the pinion angle within a threshold.

This may be accomplished at the vehicle startup whereby the EPS may broadcast the pinion angle, and the SCCM 12 may broadcast steering angle to the ECU 7. The ECU 7 may then compare the value of calculated pinion angle and SCCM steering angel. If the threshold is greater than a threshold limit (depending on hysteresis and backlash), the ECU 7 may command EPS to set pinion angle as invalid and issue an error message to the service technician or vehicle operator to indicate that service is required to align the steering column. For example, the ECU 7 may inform driver using driver warning to correct the alignment of SCCM with respect to EPS.

EPS Pinion Angle and SCCM Steering Angle Synchronization in Case of Loss of Power to EPS.

As discussed above, when a vehicle has its battery disconnected during maintenance, or if it should become fully discharged, the EPS would not be able to operate in low-power mode and track the rotor position movement while the vehicle is in this state. Accordingly, the vehicle operator can initiate a Rack Center Learn routine 20 as discussed above. The EPS may then evaluate the SCCM steering angle 24 at the rack center for being within a threshold limit. If SCCM Steering Angle is within a threshold limit, EPS Pinion Angle may synchronize with SCCM Steering Angle 25. If SCCM Steering Angle is above threshold limit, then EPS Pinion Angle shall not synchronize to SCCM Steering Angle and may initiate an error message 26. Alternatively, in some embodiments the vehicle may be able to detect when its battery has been disconnected and/or has become fully discharged. Once the battery is reconnected or recharged, the vehicle may automatically initiate the Rack Center Learn routine 20 in order to confirm that the steering column was not misaligned while the vehicle was not connected to the battery or while the battery was discharged.

The foregoing methods and routines may be implemented on computing systems, such as the electronic control unit 7. Such computing systems may be provided with a processor, a memory, and a non-transitory medium, such as a hard drive or solid-state drive, which may be provided with instructions that when executed by the processor may cause the processor to perform any of the foregoing routines or processes.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a comprehensive list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims.

What is claimed is:

1. A method for centering a rack of a vehicle comprising:

engaging a steering column of the vehicle to turn to a furthest point in a first direction, thereby turning the rack of the vehicle to a first extreme;

engaging the steering column to turn to a furthest point in a second direction opposite from the first direction, thereby turning the rack of the vehicle to a second extreme;

engaging the steering column of the vehicle to turn to a center position that correlates to the rack being centered relative to the first extreme and the second extreme; and obtaining, while the steering column is at the center position, a steering angle from a steering angle sensor that is configured to sense a rotational position of a steering wheel which is connected to the steering column of the vehicle; and in response to determining that an absolute value of the steering angle exceeds a threshold, initiating an error message.

2. The method of claim 1 wherein the first direction is left, and the second direction is right.

3. The method of claim 1 wherein the first direction is right, and the second direction is left.

4. The method of claim 1 wherein engaging the steering column to turn to the furthest point in the first direction or in the second direction is performed with an electric power steering system.

5. The method of claim 1 wherein engaging the steering column to turn to the furthest point in the first direction or in the second direction includes aggregating a rotor position angle from a rotor position sensor.

6. The method of claim 1, further comprising initiating a second error message in response to when a distance between the furthest point in the first direction and the furthest point in the second direction satisfies a second threshold.

7. The method of claim 1, further comprising, in response to the absolute value of the steering angle being below the threshold, synchronizing a pinion to the steering angle.

8. A vehicle comprising:

a rack;

a steering column connected to a steering wheel;

a steering angle sensor configured to sense a rotational position of the steering wheel;

a power steering system comprising a motor having a rotor position sensor, a gear box, an electronic control unit, and a pinion connected to the steering column;

wherein the electronic control unit is configured to:

engage the steering column to turn to a furthest point in a first direction, thereby turning the rack of the vehicle to a first extreme;

engaging the steering column to turn to a furthest point in a second direction opposite from the first direction, thereby turning the rack of the vehicle to a second extreme;

engage the steering column of the vehicle to turn to a center position that correlates to the rack being centered relative to the first extreme and the second extreme; and obtain, while the steering column is at the center position, a steering angle from the steering angle sensor; and in response to determining that an absolute value of the steering angle exceeds a threshold, initiate an error message.

9. The vehicle of claim 8 wherein the first direction is left, and the second direction is right.

10. The vehicle of claim 8 wherein the first direction is right, and the second direction is left.

11. The vehicle of claim 8 wherein engaging the steering column to turn to the furthest point in the first direction or in the second direction is performed with the power steering system which is an electric power steering system.

12. The vehicle of claim 8 wherein engaging the steering column to turn to the furthest point in the first direction or in the second direction comprises aggregating a rotor position angle from a rotor position sensor.

13. The vehicle of claim 8 wherein the electronic control unit is further to initiate a second error message in response to when a distance between the furthest point in the first direction and the furthest point in the second direction satisfies a second threshold.

14. The vehicle of claim 8 wherein the electronic control unit is further to, in response to the absolute value of the steering angle being below the threshold, synchronize a pinion to the steering angle.

15. A non-transitory computer readable medium having instructions that when executed by a computer, causes the computer to:

engage a steering column of the vehicle to turn to a furthest point in a first direction, thereby turning the rack of the vehicle to a first extreme;

engage the steering column to turn to a furthest point in a second direction opposite from the first direction, thereby turning the rack of the vehicle to a second extreme;

engage the steering column of the vehicle to turn to a center position that correlates to the rack being centered relative to the first extreme and the second extreme; and obtain, while the steering column is at the center position, a steering angle from a steering angle sensor that is configured to sense a rotational position of a steering wheel which is connected to the steering column of the vehicle; and in response to determining that an absolute value of the steering angle exceeds a threshold, initiate an error message.

16. The non-transitory computer readable medium of claim 15 wherein the first direction is left, and the second direction is right.

17. The non-transitory computer readable medium of claim 15 wherein the first direction is right, and the second direction is left.

18. The non-transitory computer readable medium of claim 15 wherein to engage the steering column to turn to the furthest point in the first direction or in the second direction is performed with an electric power steering system.

19. The non-transitory computer readable medium of claim 15 wherein to engage the steering column to turn to the furthest point in the first direction or in the second direction comprises aggregating a rotor position angle from a rotor position sensor.

20. The non-transitory computer readable medium of claim 15 wherein the computer is further to initiate a second error message in response to when a distance between the furthest point in the first direction and the furthest point in the second direction satisfies a second threshold.

21. The non-transitory computer readable medium of claim 15 wherein the computer is further to, in response to the absolute value of the steering angle being below the threshold, synchronize a pinion to the steering angle.

* * * * *